(12) United States Patent
Duquette

(10) Patent No.: US 11,741,543 B2
(45) Date of Patent: *Aug. 29, 2023

(54) GENERATING MARKET INFORMATION BASED ON CAUSALLY LINKED EVENTS

(71) Applicant: TRADING TECHNOLOGIES INTERNATIONAL INC., Chicago, IL (US)

(72) Inventor: Douglas R. Duquette, Gloucester, MA (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/470,990

(22) Filed: Sep. 9, 2021

(65) Prior Publication Data
US 2021/0407005 A1    Dec. 30, 2021

Related U.S. Application Data

(63) Continuation of application No. 16/502,304, filed on Jul. 3, 2019, now Pat. No. 11,151,649, which is a
(Continued)

(51) Int. Cl.
*G06Q 40/00* (2023.01)
*G06Q 40/04* (2012.01)

(52) U.S. Cl.
CPC .................................. *G06Q 40/04* (2013.01)

(58) Field of Classification Search
CPC ......... G06Q 40/04; G06Q 40/06; G06Q 40/00
See application file for complete search history.

(56) References Cited

U.S. PATENT DOCUMENTS 7,082,410 B1    7/2006  Anaya et al.
7,454,372 B1   11/2008  Anaya et al.
(Continued)

FOREIGN PATENT DOCUMENTS

JP    2009230277 A   * 10/2009

OTHER PUBLICATIONS

Giving content to investor sentiment: The role of media in the stock market PC Tetlock—The Journal of finance, 2007—Wiley Online Library (Year: 2007).*
(Continued)

*Primary Examiner* — Lalita M Hamilton
(74) *Attorney, Agent, or Firm* — McDonnell Boehnen Hulbert & Berghoff LLP

(57) ABSTRACT

Certain embodiments provide systems, apparatus, and methods to analyze incoming data messages and create market information constructs. An example method includes receiving a data message including an instruction to initiate a market event. The example method includes evaluating the instruction to determine whether it is associated with two or more causally linked market events. The example method also includes classifying the instruction based on the evaluating as part of a sequence of causally linked market events or as a single market event. The example method includes queuing the sequence of causally linked market events. The example method further includes detecting an end of the sequence of causally linked market events. The example method includes constructing a logically reduced market data message construct descriptive of the one or more market events represented by the queued sequence of causally linked events.

6 Claims, 7 Drawing Sheets

Related U.S. Application Data continuation of application No. 16/017,524, filed on Jun. 25, 2018, now Pat. No. 10,402,904, which is a continuation of application No. 15/634,661, filed on Jun. 27, 2017, now Pat. No. 10,032,222, which is a continuation of application No. 14/314,250, filed on Jun. 25, 2014, now Pat. No. 9,721,299, which is a continuation of application No. 13/495,392, filed on Jun. 13, 2012, now Pat. No. 8,799,135.

(60) Provisional application No. 61/496,320, filed on Jun. 13, 2011.

(56) References Cited

U.S. PATENT DOCUMENTS

| | | |
|---|---|---|
| 7,747,513 B2 | 6/2010 | Duquette et al. |
| 7,783,558 B1 | 8/2010 | Schwarz et al. |
| 8,204,817 B2 | 6/2012 | Pratt et al. |
| 8,799,135 B2 | 8/2014 | Duquette |
| 9,721,299 B2 | 8/2017 | Duquette |
| 10,032,222 B2 | 7/2018 | Duquette |
| 10,402,904 B2 | 9/2019 | Duquette |
| 2006/0271468 A1 | 11/2006 | Rosenthal et al. |
| 2008/0162324 A1 | 7/2008 | West |
| 2009/0276373 A1 | 11/2009 | Rosenthal |
| 2010/0257117 A1 | 10/2010 | Shvadron et al. |
| 2010/0268634 A1 | 10/2010 | Mackey et al. |
| 2012/0191587 A1 | 7/2012 | Brumfield |
| 2012/0317011 A1 | 12/2012 | Duquette |
| 2014/0379552 A1 | 12/2014 | Duquette |
| 2017/0293976 A1 | 10/2017 | Duquette |
| 2018/0374154 A1 | 11/2018 | Duquette |
| 2019/0325520 A1 | 10/2019 | Duquette |

OTHER PUBLICATIONS

Romano, Mary, "Several financial institutions devise data-exchange format for stock trades," Wall Street Journal, Eastern edition; New York, NY; Nov. 4, 1994.

\* cited by examiner

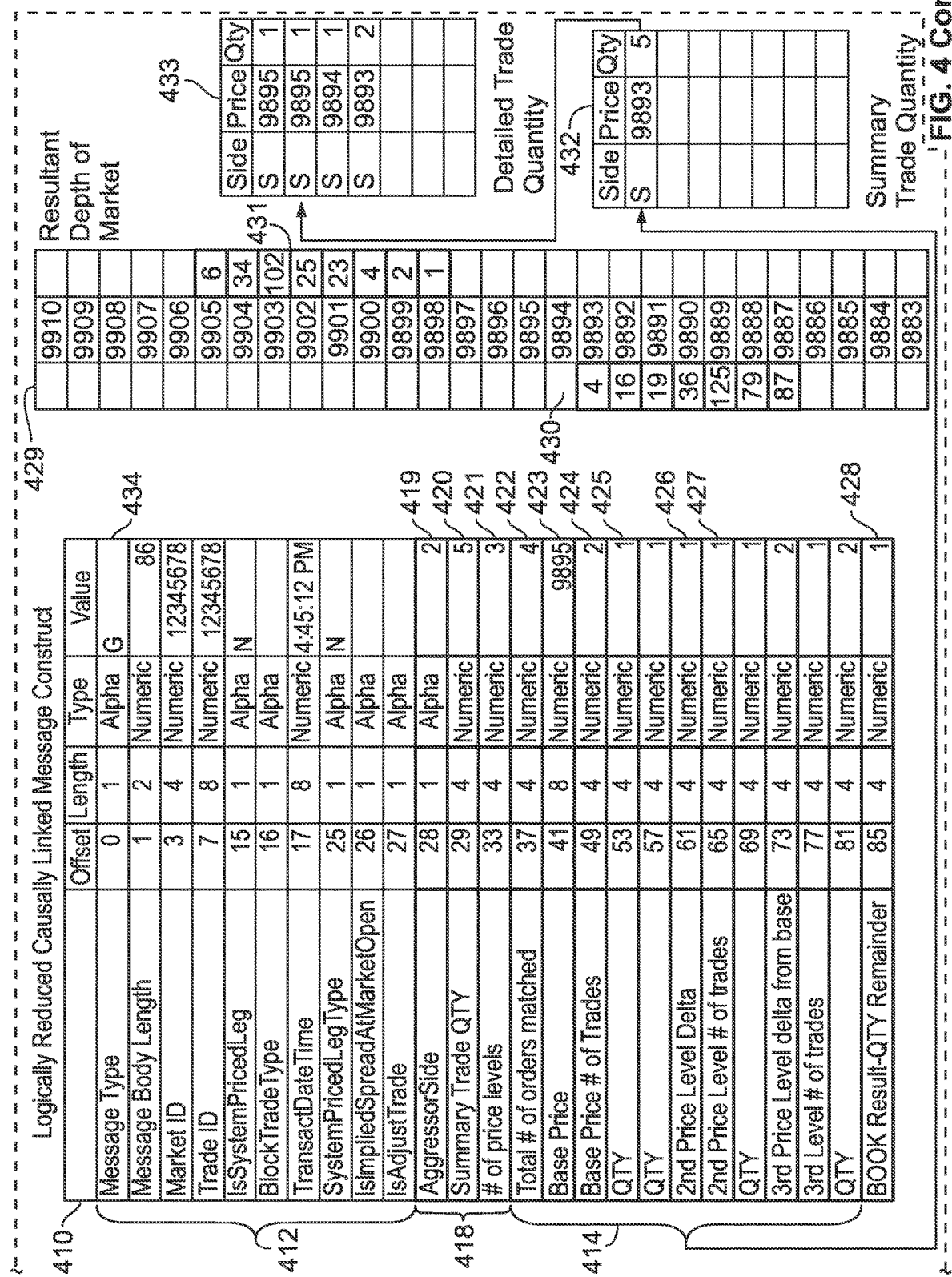

GENERATING MARKET INFORMATION BASED ON CAUSALLY LINKED EVENTS

CROSS REFERENCE TO RELATED APPLICATIONS

This application is a continuation of U.S. patent application Ser. No. 16/502,304, filed Jul. 3, 2019, now U.S. Pat. No. 11,151,649, which is a continuation of U.S. patent application Ser. No. 16/017,524, filed Jun. 25, 2018, now U.S. Pat. No. 10,402,904, which is a continuation of U.S. patent application Ser. No. 15/634,661, filed Jun. 27, 2017, now U.S. Pat. No. 10,032,222, which is a continuation of U.S. patent application Ser. No. 14/314,250, filed Jun. 25, 2014, now U.S. Pat. No. 9,721,299, which is a continuation of U.S. patent application Ser. No. 13/495,392, filed Jun. 13, 2012, now U.S. Pat. No. 8,799,135, which claims priority from U.S. Provisional Application Ser. No. 61/496,320, entitled "System and Method for Logically Irreducible Market Information Data Objects Describing Two or More Causally Linked Market Events," which was filed on Jun. 13, 2011, the contents of each of which are hereby incorporated herein by reference in their entirety for all purposes.

FIELD OF THE INVENTION

The presently discussed embodiments are generally directed towards electronic trading. More particularly, the presently discussed embodiments are directed towards more efficient information distribution in an electronic trading environment.

BACKGROUND

At one time, there were only open-outcry exchanges where traders, specifically buyers and sellers or representatives of the same, would come together to trade amongst each other in person. As such, market events and market information (for example, aggregation of market events) were immediately and simultaneously visually and audibly available to the local traders and they could take action synchronously with market events if they chose to. Over time, the process of trading has largely moved onto electronic trading platforms offered by all of the major global financial exchanges and market information is serially disseminated piece by piece in the form of market data messages. Serial dissemination of individual markets or amongst groups of markets often results in timing conflicts and unnecessary messaging delays amongst different aspects of market information that traders desire to make optimal trading decisions.

With the advent of electronic trading, traders can participate via a client device(s) by communicating over physical networks (or potentially via direct memory sharing methods) through an application program interface to facilitate electronic messaging between traders' client devices and the exchange. Traders' client devices can be located at variant distances from a centralized exchange hub, including from within the same physical structure (for example, co-location). An electronic exchange operates at least one electronic market, that processes incoming orders to buy (bids) and sell (offers) submitted by traders and then broadcasts the resulting market events to all connected and subscribed traders in the form of time sequenced serial data streams commonly known as market data.

Since the advent of electronic trading, the industry as a whole has spent very large sums of money on ever advancing hardware, software and infrastructures to reduce any latency in the creation and distribution of market data and the consequent acquisition of market information by traders' client devices to the fastest degree possible. A point has been reached where microsecond and nanosecond differentials (for example, latency) in the acquisition of market information contained within the market data streams over any given set of individual market data messages can be worth large sums of money.

Market data volumes continue to grow dramatically. Electronic exchanges and/or intermediary distributors of market information continue to struggle to provide traders with actionable market information due to the limitations of the methodologies and infrastructures used to deliver a useful market information feed. Most often, traders want access to as much of this information as fast as possible so that they can make more efficient and more effective/timely trades. Despite the best efforts and large investments by everyone involved, many client devices continue to suffer from unnecessary delays in market information updates and on occasion the loss of content, due to data coalescing methods and other reasons, in the market information updates that are received. At present, there are still many disadvantages to the current methods of distribution, or at the very least the current solutions are incomplete.

BRIEF DESCRIPTION OF THE FIGURES

Example embodiments are described herein with reference to the following drawings, in which.

DETAILED DESCRIPTION

I. Overview

Figure 1:
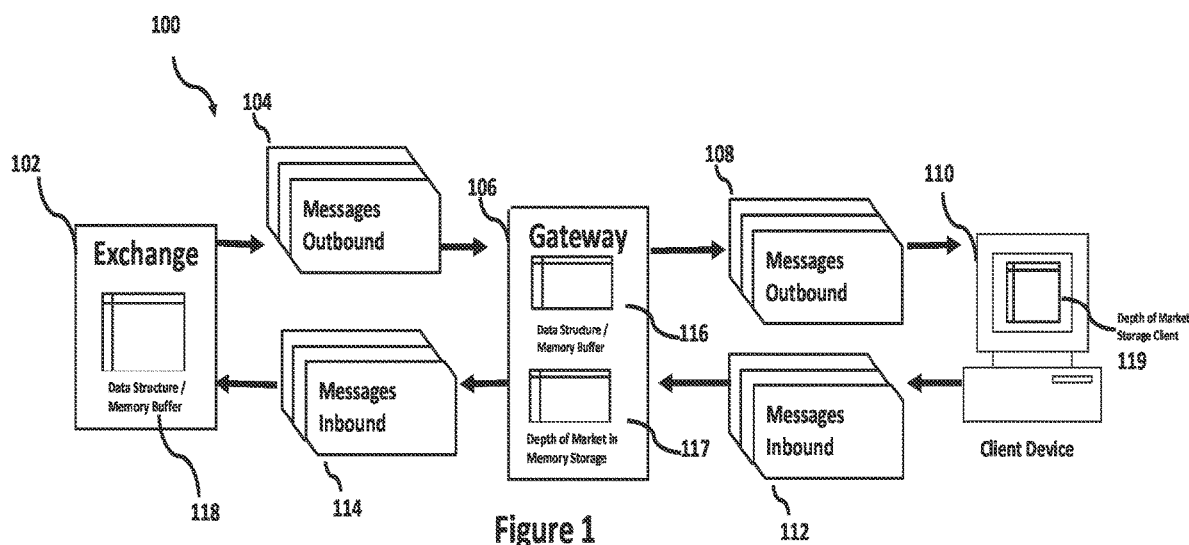
FIG. 1 is a block diagram illustrating an example system to create data constructs used to efficiently communicate causally linked market events as single complete market information objects in an electronic trading environment.

Certain example embodiments are directed to systems, methods and apparatuses to create data constructs used to efficiently communicate causally linked market events as single, complete market information objects in an electronic trading environment. The example embodiments are premised on a concept that the logical reduction of content and sequencing of data describing causally linked market events within a single market data message can reduce the size of and number of market data messages currently used to fully describe market events thereby reducing latencies in the communication of market information from an exchange to a trader's client device.

Latency is defined herein as a delay between an occurrence of a market event creating new market information within an exchange and a trader becoming fully informed about market information causally linked to the market event. There are three general types of latencies in the transfer and use of market information via a state of the art electronic trading platform which includes the entirety of all associated electronic trading infrastructure including the exchange, any intermediary platform, and any trader client device. The general types of latency are: data transfer latency; computational latency; and crowding out effect latency.

Data transfer latency refers to delay in the electronic transfer of messages for example containing data (for example, market data) between an electronic exchange system and trading participants. Data transfer latency may include latency introduced through a physical distance between transmitting and receiving devices (e.g., between a trading device and an exchange device), routing delay, buffering delay, etc.

Computational latency represents any delay in the processing of transferred market data before it becomes useful as market information to the consuming device for whatever purpose. For example, the number of messages, pieces of data, and/or computational steps that are completed to produce the desired market information govern computational delay.

Crowding out effect latency occurs when the market data for two or more markets is simultaneously broadcast or consumed in a serial fashion. For example, major global exchanges such as CME, NYSE, Eurex and others have collectively tens of thousands of markets trading and broadcast market data serially for each market and often common groups of markets within sectors such as energy (crude oil, natural gas, etc.), world currencies, metals (gold, silver, etc.), grains, equities (SP500, Dow Jones), etc., as market events occur. As a result, a trader device may need to process thousands of market data messages before a market data message of interest becomes available even if the event generating the information of interest occurred simultaneously with or just prior to other events from other markets that happened to get on the wire for whatever internal exchange processing reason(s).

Most major exchanges attempt to mitigate crowding out effect latency by adopting unreliable user datagram protocol (UDP) multicast in place of transmission control protocol/internet protocol (TCP/IP). UDP enables parallelizing of distribution of market groups across multiple UDP multicast channels and also overcomes a drawback of TCP/IP which requires each message to be separately sent to each connected participant in a round robin manner. Instead, UDP enables each message to be sent once and shared amongst all participants. However, within any given channel, the market data output of numerous individual markets is serially broadcast. Frequently, the separate channels are re-aggregated and re-serialized by downstream trader devices for different reasons. Crowding out latency may be further exacerbated by inefficiencies in either computational or data transfer latency.

Current methods of market information dissemination via commonly used market data output constructs fall short of achieving the minimal latencies possible. Not only do current methods fall short of the necessary bar, current methods actually cause frequent, substantial, and unnecessary increases in the latency profile of market information acquisition by traders, especially as trading activity density increases and market opportunities are most prevalent. The degree of latency experienced is generally proportional to the density of the activity, where activity density is the rate of market events over any given time frame.

A majority of market data originating from an exchange is generated in response to market events. Market events, as used herein, are order management actions initiated by traders that lead to two possible types of market data messages. For example, when a trader electronically transmits an order to the exchange that includes at least a direction parameter (for example, buy or sell the market), a price parameter and a quantity parameter, then two outcomes are possible once the order reaches the matching engine process operating within the exchange. The first possible outcome results in either the full or partial match of the order if the order price is equal to or better than a pending unmatched order with an opposite direction parameter (for example, buy versus sell) (referred to herein as a Type 2 market event). In this instance, a trade event will be advertised via electronic message(s) to all participants. Alternatively, the second possible outcome results in the generation and broadcast of electronic message(s) to all market participants advertising a new available buy or sell quantity at the specified price that is a result of a trade event where prior liquidity was withdrawn by the occurrence of the trade(s) matching, or new liquidity being added to the market (referred to herein as a Type 1 market event). A Type 2 event is followed by a Type 1 event at some interval depending on internal exchange processing methods, for example. Type 1 events may be broadcast alone except in the case in which a Type 1 message(s) may be further advertised as part of an implied quantity available to buy or sell in a related market. In certain embodiments, a Type 2 event can generate Type 1 messages in related implied market(s) in addition to any Type 1 messages in the direct market.

Market data messages generated in conjunction with market events contain information that traders desire to know as fast as possible. For example, traders may want to know about last trade price and last trade quantity details and/or what prices and quantities currently remain unmatched and available as a result of any absorption of liquidity as matching occurs. There is always a timing conflict between the two types of information arising from the serial nature of market events as reported via market data streams. This is because a market event resulting in an advertisement without any match (Type 1) will generate at least one message but may generate more than one in certain cases, such as when the initiating Type 1 message becomes part of an implied message sequence whereby liquidity in one market becomes available in another market via internally managed exchange traded spreads. Comparatively, a market event resulting in a match (Type 2 event) will usually result in at least two causally linked messages: one for the reporting of the trade and another to report the resulting unmatched depth of market orders book update directly caused by the removing of the corresponding matched quantity from the preceding depth of market state and additional message(s) to adjust implied liquidity linked to the direct liquidity withdrawn from the market causally by the trade event. An order could match with a single order of the same or greater quantity or with multiple orders whose aggregate sum is equal to or greater than the incoming order quantity.

For example, an order to sell with a quantity of 100 could produce over one hundred messages (for example, when matching against 100 buy orders, each with a quantity of 1), just two messages (for example, when matching against a single buy order with a quantity of 100 or more), or any combination in between, at any given time. In some cases, certain exchanges may send a single large message with variable amounts of repetitive information. In order to maintain the integrity or usefulness of the information content within the auction process of any given market or related markets, every downstream device is to process all of the individual messages or message elements serially causing unnecessary latencies of all types described herein thereby unnecessarily delaying what a trader needs to know and when he can know it.

Certain embodiments provide a causally linked market data construct to reduce data transfer latency, crowding out latency, computational latency, etc. Certain embodiments help mitigate or eliminate time conflicts between what a trader wishes to know and when he or she can know it. Certain embodiments help facilitate acquisition of a trader's desired market information during data transfer and/or processing throughout a global electronic trading infrastructure.

Current market data methods and constructs too often create and distribute more market data messages or data volumes than are necessary to fully and completely communicate the market information traders use in making trading decisions. Excess messages or intra-message data entries exacerbate data transfer latency and/or other propagation delays, computational delays, crowding out effect delays and time conflicts between different types of market information, for example.

As an example, a trader might base most of his or her decisions on changes to the set of unmatched orders available to buy or sell (referred to above as a Type 1 market event) known as the depth of market or current book. In another example, a trader might place more emphasis on last trades (referred to above as a Type 2 market event). In yet another example, a combination of both Type 1 and Type 2 market events may be implemented. In the case of a Type 2 event, reliance by the trader on the resultant book update suffers a time conflict between the processing of a variably sized stream of last trade outputs followed by the resultant book update. The disclosed systems, methods and apparatuses build on this premise to provide an efficient mechanism to minimize data distribution volumes in order to deliver causally linked market information simultaneously in a logically reduced single message construct thereby eliminating any time conflict due to the processing of one event type until the other type becomes available. The resultant construct delivers all information simultaneously (or at least substantially simultaneously given data transmission and processing delay) and allows the trader to access the information of choice in any sequence desired. Thus, the disclosed systems, methods and apparatuses provide that the trader simultaneously receives current causally linked market event information to be referenced at will with reduced latency, and at the same time reduces the burden on exchange, intermediary and client side devices especially as activity density levels are higher.

Markets for trading are about information and about distribution of information. For example, electronic markets may take information, convert the information into market data, identify certain fields, and then distribute that data to consumers. Electronic markets, however, are not solely about the data but rather about the information that the data represents. As such, information distribution latency can be improved by reconfiguring how the information is represented by a given stream of data.

In certain embodiments, data traffic can be reduced based on relationship(s) between market information. Logical relationship(s) between market information are identified by monitoring market data traffic and analyzing market events (for example, the occurrence and/or sequencing of Type 1 and Type 2 events). Rather than having a complete set of information regarding a trade or set of trades, if a user (for example, a human and/or computer user) understands a context and logical relationship(s) between events, information can be grouped (for example, causally linked), thereby reducing information to be sent over the network (for example, logically irreducible). Information regarding related market events can be packaged together such that the underlying information is rapidly and easily understandable by a recipient. Packaging information in organized, easy to process bundles or message constructs can reduce network traffic (and associated latency), for example.

Market events can either add liquidity to a market or withdraw liquidity from the market. Liquidity is added to a market by placing an order into the market, for example. Liquidity is withdrawn by a user canceling the liquidity that he or she added with no match, by matching a user's liquidity with someone else's liquidity, and so on. A variety of events may occur in a market, such as market opens, market closes, market halts, etc., but the addition or withdrawal of liquidity is at the essence of a market auction process. Participants in an electronic market can objectively know about the market(s) through acquisition and interpretation of Type 1 and Type 2 market data messages.

For example, when trading a spread via an exchange and withdrawing liquidity as a result of a match with the spread, the trading exchange is going to send a match with the spread instrument itself as well as a match for each leg of the spread (Type 2) and subsequent Type 1 messages adjusting remaining liquidity in the market(s) related to the spread. The combination of matches and the resultant liquidity becomes a logical information package. The number of matches that have occurred sequentially is examined such that base information for a causally linked data set can be anchored at the first instance of that event type. Then, the remainder of events in the captured sequence can be associated with that initial anchor.

A causal link can be established using a rule set including possible combination and permutations of market information, for example. The data can be organized and grouped by turning the causally linked information into a coordinated block of data in which the data included is used to completely describe the block of market information.

To facilitate the creation of causally linked data constructs according to one example method described herein, an example system appends multi-element event summary data to a market event message immediately following any preamble of requisite administrative data such as a contract identifier. The additional summary data may be utilized to update the order book and communicate the nature and magnitude of the causally linked trade events. The summary data is followed by a logically representation of detailed matched quantities whose price levels can be logically inferred using parts of the preceding summary data and any preceding market data already in memory at the consuming device as logical helper keys. For example, a logically condensed representation has reduced the data provided to a level that is complete within its logical content does not have extraneous or repetitive information within it. In certain embodiments, such logically reduced or compressed information cannot be reduced further without information loss, for example. Such market information objects as described herein can be created by the exchange or by any intermediary device or software program if necessary and propagated further downstream as a single message versus sending variable amounts of individual messages for each matched quantity followed by any book changes resultant from the trade event. An example method may be applied to any other type of causally linked market event(s) that use more than a single message to communicate the necessary market information completely.

Certain embodiments provide a method including receiving a data message associated with a tradeable object at a first computing device, the message including an instruction to initiate a market event. The example method includes evaluating the instruction to determine whether the instruction is associated with two or more causally linked market events. The example method also includes classifying the instruction, based on the evaluating as part of a sequence of causally linked market events or as a single market event. The example method includes queuing the sequence of causally linked market events. The example method further includes detecting an end of the sequence of causally linked market events. The example method includes constructing a logically reduced market data message construct descriptive of the one or more market events represented by the queued sequence of causally linked events. The example method also includes transmitting the logically reduced market data message construct to a second computing device.

Certain embodiments provide a tangible computer readable storage medium including instructions that, when executed, cause a computing device to at least receive a data message associated with a tradeable object at a first computing device, the message including an instruction to initiate a market event. The example computing device is to evaluate the instruction to determine whether the instruction is associated with two or more causally linked market events. The example computing device is to classify the instruction, based on the evaluating as part of a sequence of causally linked market events or as a single market event. The example computing device is to queue the sequence of causally linked market events. The example computing device is to detect an end of the sequence of causally linked market events. The example computing device is to construct a logically reduced market data message construct descriptive of the one or more market events represented by the queued sequence of causally linked events. The example computing device is to transmit the logically reduced market data message construct to a second computing device.

Certain embodiments provide an apparatus including a receiver to receive data messages, each message relating to a market event. The example apparatus also includes a processor. The example processor is arranged to evaluate the received data messages to determine whether the received data messages are associated with two or more causally linked market events. The example processor is to classify the received data messages, based on the evaluating as part of a sequence of causally linked market events or as a single market event. The example processor is to queue the sequence of causally linked market events in a memory. The example processor is to detect an end of the sequence of causally linked market events. The example processor is to construct a logically reduced market data message construct descriptive of the one or more market events represented by the queued sequence of causally linked events. The example processor is to transmit the logically reduced market data message construct.

The systems, methods, and apparatuses facilitate creating causally linked data constructs that benefit the trader and reduce the overall burden on system and network resources. While some illustrations have been provided above, additional examples are provided herein. Modifications may also be made to the system and method without departing from the spirit or scope of the invention. Additional features and advantages of the example embodiments will be set forth in the description that follows. The features and advantages of the example embodiments may be realized and obtained through the embodiments particularly pointed out in the appended claims. These and other features will become more fully apparent from the following description and appended claims.

Certain examples provide systems, methods and apparatuses to create data constructs used to efficiently communicate market information about causally linked market events in an electronic trading environment in the form of market data messages. The messages described herein include market information related to one or more tradable objects that are traded at an electronic exchange. The example embodiments are particularly useful as market activity density rises potentially causing substantially increased amounts of back-to-back market updates variably dispersed between trades (Type 2) and depth of market changes (Type 1), in the form of messages, being sent from the electronic exchange. Increased market activity density increases latency, for example. The size and number of messages that a system communicates between source and destination and then process computationally to convert and derive the needed market information is directly proportional to the amount of latency of market information transfer and use experienced at any given time.

The example embodiments are also useful at most other times during the course of a trading day to optimally or improvably utilize the network and system resources and thereby limiting the effects of propagation, computational and crowding out latencies. According to the example embodiments, optimal or improved utilization of system resources is provided by reducing the number and size of messages to communicate to a client device, complete market information about varied market events related to a tradable object. Messages that are generally of the utmost importance to a trader relate to market depth price and quantity change events (Type 2) or trade related events (Type 1), such as last traded price and last traded quantity.

Market events are causally linked when a single inbound message to an exchange results in or is associated with two or more market information changes that traders generally wish to know about. For example, as will be discussed further below, traders generally base the placement of their orders relative to the current and any subsequent changes to depth of market prices and quantities, trade prices and quantities, or a combination of both. As the depth of market prices and quantities represent the most actionable (for example, able to be bought and sold as of the last known update from an exchange) state of the market, it is beneficial that the depth of market particularly the inside market (for example, a highest bid or lowest offer price among competing market makers) is displayed or processed by the trading system as quickly and as accurately as possible, with a latency as close to zero as possible. As trades occur, they cause simultaneous (or substantially simultaneous assuming some transmission and/or processing latency) changes to pre-existing depth of market to varying degrees and therefore are causally linked events and can be communicated as a single object of complete information describing the event and its details to a client device.

Market data messages can arrive at a gateway and/or exchange in one or more data packets to be processed, for example. Based on the sequence of trades and associated type(s) of data, market data messages associated with the sequence of trades can be automatically sorted and packaged into a combined message construct as events occur. Aggregation of market event information continues while the gateway or exchange is receiving the same type of information for the same trading contract. Otherwise, the aggregated construct is completed and transmitted, and the gateway/exchange looks for the next set of messages to be linked.

In certain embodiments, construction of causally linked market data messages can be facilitated by appending descriptive and relevant multi-element event summary data following a preamble of administrative data, such as message type, followed by a logically compressed representation of detailed matched quantities. Price levels of matched quantities can be logically deduced from entries indicative of offsets from a base price as a number of price increments. Price levels can also be logically deduced, as will be demonstrated below, using parts of preceding event summary data and preceding market data already stored in memory resident on the gateway device or memory/storage resident on the client device as logical helper keys. Adding multi-element event summary data to market data messages collectively gives a trader an ability to know what he or she should know upon receipt of a single message rather than having to process a random number of separate messages or sort through a variable amount of duplicative data entries within a single message before the requisite information becomes fully available.

Such a logically reduced data construct is sufficient within itself to immediately and accurately both update the book and completely communicate the nature and magnitude of the causal trade event summarily or in detailed form to be consumed at will. Moreover, inclusion of certain summary data at the beginning of the trade event construct such as the resultant remaining price and/or quantity of any highest bid or lowest offer available after the trade event occurred enables trader awareness to changes in the depth of market sooner (for example, lower latency) versus the methods commonly used throughout the industry that currently require the processing of the trades that occurred and then having to wait for any Type 1 depth update messages for either the direct or any implied prices or quantities so effected by the original trade (Type 2) event(s).

Market information objects, as described herein, can result from trade events and/or other types of causally linked market events that use more than a single market data message to completely communicate market information resulting from the event. For example, modifications to existing orders or user requests for market snapshots to initialize a current state of market depth, which are disseminated from an exchange in multiple messages, are among but not limited to, the types of market events that are envisioned. Exchanges and intermediaries can adopt systems, methods and apparatuses to provide standardization for causally linked messages, for example. Any resulting standardization provides a mechanism by which the data constructs can be propagated intact to all endpoints and may be easily and quickly interpreted thereby minimizing the effects of propagation, computational, and crowding out latencies in modern electronic trading systems.

Certain example embodiments are directed towards operation at an electronic exchange. However, an intermediary device, such as a gateway positioned between an electronic exchange and the client device, may be an alternative point of creation for data constructs used to efficiently communicate causally linked market information objects to the client device in cases where the relevant exchange does not produce the herein described data constructs.

Thus, certain embodiments provide message content, content sequencing, and structure intended to optimize or otherwise improve latency characteristics of information transfer between source and consumer given an implementation of electronic data transport media or methodology.

While the example embodiments are described herein with reference to illustrative embodiments for particular applications, it should be understood that the example embodiments are not limited thereto. Other systems, methods, apparatuses and advantages of the present invention will be or become apparent to one with skill in the art upon examination of the following drawings and description. As previously stated, it is intended that all such additional systems, methods, apparatuses, features, and advantages be within the scope of the present invention, and be protected by the accompanying claims.

II. Example Electronic Trading System

Market data, as used herein, describes data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include financial products, stocks, options, bonds, future contracts, currency, warrants, funds derivatives, securities, commodities, swaps, interest rate products, index-based products, traded events, goods, or a combination thereof. A tradeable object may include a product listed and/or administered by, for example, an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

FIG. 1 depicts a block diagram illustrating an example system 100 utilized by exchanges 102, intermediaries via gateways 106 and client devices 110 in an electronic trading environment. More specifically, FIG. 1 includes an electronic exchange 102, a gateway 106, and a client device 110, configured to communicate messages 104, 108, 112, 114.

According to certain example embodiments, communication between an electronic exchange and a client device involves an exchange broadcasting messages to a connecting network device such as a gateway or router (or some other intermediary device, collectively referred to herein as the "gateway" 106 shown in the example of FIG. 1), and the network device then relaying the market data contained in such messages to the client device 110. Software and hardware components or a combination thereof can be used to implement example embodiments at the exchange 102 and/ or at the gateway 106, for example. Gateways 106 serve many client devices 110 simultaneously and reductions in the number of messages 104, 108, 112 and 114 and computational loads throughout the systems are a high value gain.

Electronic exchange 102 may host one or more computer-based electronic markets which includes one or more computers (and/or programs) running software that receives and transmits market information to and from gateway 106 in the form of messages which may include, for example, price, trade, order, and fill information. Traders may connect to the one or more electronic markets to trade tradable objects via one or more client devices 110. Gateway 106 is an intermediary device and includes one or more computers (and/or programs) running software that receives and transmits market information in the form of messages which may include price, order, fill information and other information to and from exchange 102. Client device 110, also referred to as a trading device, is a computer or other computing device running software that receives one or more messages 108 from gateway 106.

Also included in FIG. 1 are illustrative messages 104, 108, 112, 114. Messages 104 and 108 contain market information relating to a tradable object. Messages 104 and 108 may include current depth of market information, trade related information, or other information necessary to initialize and use the system effectively, for example. Determining the actual contents of messages 104 and 108 may be performed at gateway 106 or at client device 110. The data constructs and methods used to communicate market information are customarily determined by exchange 102 but may be interpreted and re-constructed to define causally linked data constructs and propagated to client device 110 if not already properly constructed and communicated by exchange 102, for example.

A. Exchange

The exchange 102 may be owned, operated, controlled, or used by an exchange entity. Example exchange entities include the CME Group, the London International Financial Futures and Options Exchange, the Intercontinental Exchange, and Eurex. The exchange 102 may include an electronic matching system, such as a computer, server, or other computing device, which is adapted to allow tradeable objects, for example, offered for trading by the exchange, to be bought and sold. The exchange 102 may include separate entities, some of which list and/or administer tradeable objects and others which receive and match orders, for example. The exchange 102 may include an electronic communication network ("ECN"), for example.

The exchange 102 may be an electronic exchange. The exchange 102 is adapted to receive order messages and match contra-side trade orders to buy and sell tradeable objects. Unmatched trade orders may be listed for trading by the exchange 102. The trade orders may include trade orders received from the client trading device 110 or other devices in communication with the exchange 102, for example. For example, typically the exchange 102 will be in communication with a variety of other trading devices (which may be similar to client trading device 110) which also provide trade orders to be matched.

The exchange 102 is adapted to provide market data for each of the markets hosted therein. Market data may be provided in one or more messages or data packets or through a shared memory system. For example, the exchange 102 may publish a data feed to subscribing devices, such as the trading device 110 or gateway 106. The data feed may include, for example, packetized and/or streaming market data.

The exchange 102 broadcasts many different types of market information messages 104 to be received by connected gateways, traders, brokers, etc. Gateway 106 connects to the exchange 102 to receive the broadcast market information messages 104 which may, in turn, be modified and relayed to client device 110. It should be understood that a message from one exchange may contain market information representing a different tradable object than a message from a second exchange. As used herein, the term "tradable object" refers to anything that can be traded with a quantity and a price. For example, tradable objects may include, but are not limited to, all types of traded financial products, such as, stocks, options, bonds, futures, currencies, and warrants, as well as funds, derivatives, and collections of the foregoing. Moreover, tradable objects may include all types of commodities, such as grains, energy, and metals. Also, a tradable object may be "real," such as products that are listed by an exchange for trading, or "synthetic," such as a combination of real products that is created by the trader (for example, a spread). A tradable object may also be a combination of other tradable objects, such as a class of tradable objects or a trading strategy.

In general, a message 104 from exchange 102 may include market information representing prices and quantities for a tradable object. For example, the message may represent market information related to the inside market, such as a highest bid (for example, highest pending order to buy price and quantity) or a lowest ask (for example, lowest pending order to sell price and quantity), or market information relating to prices and quantities outside the inside market generally known as the depth of market. It should be understood that the messages received from the electronic exchange 102 may include other data and should not be considered limited to the examples referenced above.

The electronic exchange 102 may also broadcast separate messages 104 containing trade related market information, for example, market information relating to individual trade matches. A trade match is defined herein as an electronic trading system 100 matching a trader willing to buy a tradable object for a price to another trader offering to sell the same tradable object at the same or better price, resulting in a trade match.

The exchange 102 broadcasts messages 104 to generally let all traders know that matches have occurred at certain price levels, without revealing any specific information, such as who placed the order. Trade match messages broadcast to all traders may contain only public and anonymous order information, such as last traded price and last traded quantity. A trade related message is the primary public source for all traders to know what quantities and prices have been matched in the market.

The exchanges 102 collectively and individually are the primary governors of system wide latency. Each exchange 102 dictates an amount, type and timing of any data constructs and methods it will use to communicate market information to traders. Regardless of the message or message type provided by an exchange 102, the disclosed data constructs and methods referenced in the example embodiments may be implemented and utilized.

B. Gateway

As discussed above, gateway 106 includes one or more computers (and/or programs) running software that receives and transmits market information 104, 114 to and from the exchange 102. As used herein, a computer or other computing device includes any device with memory and a processor capable of processing information to compute a desired result. Thus, a gateway 106 can be a computer of any size such as a network server, workstation, personal computer, or laptop, but generally, the gateway is any computing device that has the processing capability to perform the function described herein.

The gateway 106 may include one or more electronic computing platforms. For example, the gateway 106 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 106 may facilitate communication. For example, the gateway 106 may perform protocol translation for data communicated between the client device 110 and the exchange 102. The gateway 106 may process an order message received from the client device 110 into a data format understood by the exchange 102, for example. Similarly, the gateway 106 may transform market data in an exchange-specific format received from the exchange 102 into a format understood by the client device 110, for example.

The gateway 106 may include a trading application, similar to the trading applications discussed above, that facilitates or improves electronic trading. For example, the gateway 106 may include a trading application that tracks orders from the client device 110 and updates the status of the order based on fill confirmations received from the exchange 102. As another example, the gateway 106 may include a trading application that coalesces market data from the exchange 102 and provides it to the client trading device 110. In yet another example, the gateway 106 may include a trading application that provides risk processing, calculates implieds, handles order processing, handles market data processing, or a combination thereof.

In certain embodiments, the gateway 106 communicates with the exchange 102 using a local area network, a wide area network, a virtual private network, a T1 line, a T3 line, an ISDN line, a point-of-presence, the Internet, and/or a shared memory system, for example.

In an embodiment, the electronic exchange 102 broadcasts messages containing market information to one or more communicatively coupled or otherwise connected gateways 106. Gateway(s) 106 then sends the message 108 data to the client device(s) 110. In certain embodiments, instead of retransmitting each message containing pieces of market data related to causally linked market events as the data is received, the gateway 106 may be configured to logically reduce causally linked market events to optimize network and system resources. For example, the causally linked market events contained in two or more messages or in a single excessively large message may be reduced into a single low latency object/message for delivery to the client device 110. Messages containing causally linked market events typically arrive simultaneously (or substantially simultaneously assuming some transmission and/or processing latency) from the exchange 102 with little or no lag between messages thereby allowing for a logical reduction in message content as discussed herein. A comparative gain resulting from reductions in downstream computing and crowding out latencies on the way to or at the client device 110 far outweighs any localized computing delay resulting from the construction of the objects on the gateway 106.

Each message sent from the electronic exchange 102 contains a message type. Message types may not be consistent from between different exchanges, so it is beneficial for a gateway to have knowledge of the different possible types of messages and causal link(s) between them. When a message is received at gateway 106, a determination of message type is made by comparing the header to the already known message types. Based on a message type associated with each message 104, gateway 106 identifies one or more causally linked messages following the current message 104, and inspects the next message within the same packet to determine if the causal linkage should be continued. In certain embodiments, causal links are known in advance and are finite in scope and number. Arrival of a specific message type indicates a start of a possible causal link, and subsequent messages are linked to the initial message until there is a message that is not logically linkable (for example, a different message type, different contract, etc.).

If a next message is not logically linkable, the message 104 may be sent to the client device 110 without delay. Alternatively, if the message type indicates that causally linked messages may be immediately following, the gateway 106 may be configured to hold the message 104 in a memory buffer 116 pending receipt of additional causally linked messages. The gateway 106 "knows" that additional causally linked messages are to serially follow the first message received in the causally linked group. In some cases, the first message will already be present in some part of the program's memory and thereby available for processing. Once all relevant market information has been received and processed, the gateway 106 constructs a message to send to client device 110.

C. Client Device

As disclosed above, client device 110 is a computing device that allows a trader to participate in a market hosted at an exchange 102. The client device 110 can create one or more specialized interactive trading screens on displays connected to the client device terminal, for example. Trading screen(s) enable traders to enter and execute orders, obtain market quotes, and monitor positions, for example. A range and quality of features available to the trader on a trading screen varies according to a specific application running, such as fully or partially automated "black box" trading software or other types of strategy trading software.

The client trading device 110 may include one or more electronic computing platforms. For example, the client device 110 may include a desktop computer, hand-held device, laptop, server, a portable computing device, a trading terminal, an embedded trading system, a workstation, an algorithmic trading system such as a "black box" or "grey box" system, cluster of computers, or any combination thereof. As another example, the client device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the client device 110 may be implemented as a personal computer running a copy of X_TRADER®, an electronic trading platform provided by Trading Technologies International, Inc. of Chicago, Ill. (hereinafter referred to as "Trading Technologies". As another example, the client device 110 may be a server running a trading application providing automated trading tools such as ADL™, AUTOSPREADER®, and/or AUTOTRADER™, also provided by Trading Technologies. In yet another example, the client device 110 may include a trading terminal in communication with a server, where collectively the trading terminal and the server are the client device 110.

The client device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The client device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order.

In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the client device 110 from another computer readable medium. For example, the trading application (or updates to the trading application) may be stored by a manufacturer, developer, or publisher on one or more CDs or DVDs, which are then loaded onto the client device 110 or to a server from which the client device 110 retrieves the trading application. As another example, the client device 110 may receive the trading application (or updates to the trading application) from a server, for example, via the Internet or an internal network. The client device 110 may receive the trading application or updates when requested by the client device 110 (for example, "pull distribution") and/or un-requested by the client device 110 (for example, "push distribution").

The client device 110 may be adapted to send order messages. For example, the order messages may be sent to through the gateway 106 to the exchange 102. As another example, the client device 110 may be adapted to send order messages to a simulated exchange in a simulation environment which does not effectuate real-world trades.

The order messages may be sent at the request of a user. For example, a trader may utilize the client device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system (which may or may not utilize data packets, for example). For example, an order message may be sent from the client device 110 to the exchange 102 through the gateway 106. The client device 110 may communicate with the gateway 106 using a local area network, a wide area network, a wireless network, a virtual private network, a T1 line, a T3 line, an integrated services digital network ("ISDN") line, a point-of-presence, the Internet, and/or a shared memory system, for example.

III. Expanded Example Electronic Trading System

Figure 2:
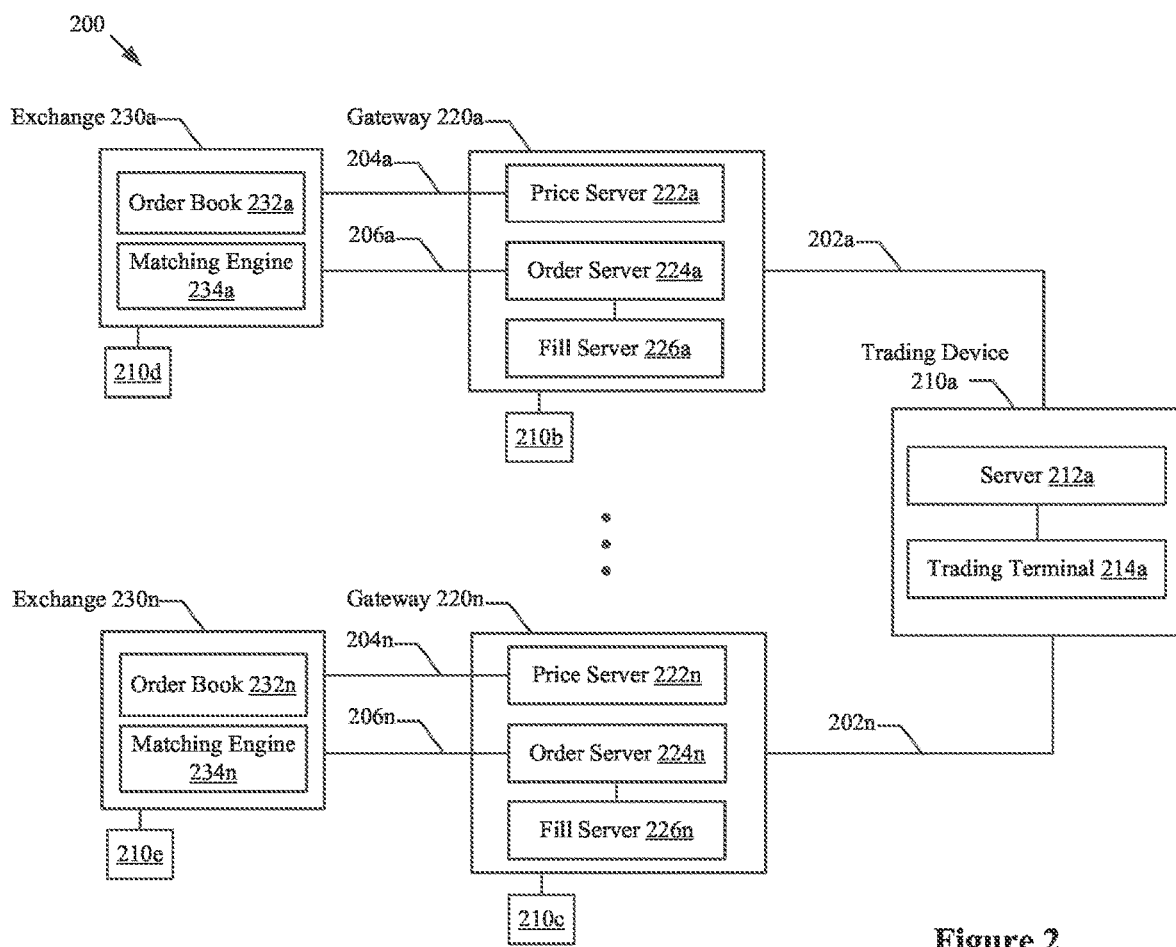
FIG. 2 illustrates a block diagram of an example electronic trading system in which certain embodiments may be employed.

FIG. 2 illustrates a block diagram of another example electronic trading system 200 in which certain embodiments may be employed. In this example, a client device 210a is in communication with an exchange 230a through a gateway 220a. The following discussion mainly focuses on the client device 210a, gateway 220a, and the exchange 230a. However, the client device 210a may also be connected to and communicate with any number of gateways 220n connected to exchanges 230n. The communication between the client device 210a and other exchanges 230n may be the same, similar, or different than the communication between the client device 210a and exchange 230a. Generally, each exchange 230a to 230n has its own preferred techniques and/or formats for communicating with a trading device, a gateway, the user, or another exchange.

The client device 210a, which may be similar to the trading device 110 in FIG. 1, may include a server 212a in communication with a trading terminal 214a. The server 212a may be located geographically closer to the gateway 220a than the trading terminal 214a. As a result, the server 212a has latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The client device 210a may include, additional, different, or fewer components.

The client device 210a may communicate with the gateway 220a and the exchange 230a using one or more communication networks 202a, 204a and 206a. As used herein, a communication network is any network, including the Internet, which facilitates or enables communication between, for example, the client device 210a, the gateway 220a and the exchange 230a. For example, as shown in FIG. 2, the client device 210a may communicate with the gateway 220a across the multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 106 of FIG. 1, may include a price server 222a, order server 224a, and fill server 226a. The gateway 220a may include additional, different, or fewer components. The price server 222a may process price data. Price data includes data related to a market for one or more tradeable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the client device 210a and the exchange 230a using one or more communication networks 202a, 204a and 206a. For example, as shown in FIG. 2, there may be two communication networks 204a and 206a connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 102 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the client device 210a. The client device 210a, for example, using a trading application, may process this data. For example, the data may be displayed to a user. In another example, the data may be utilized in a trading algorithm to determine whether a trade order should be submitted to the exchange 230a. The client device 210a may prepare and send an order message to the exchange 230a.

In certain embodiments, the gateway 220a is part of the client device 210a. For example, the components of the gateway 220a may be part of the same computing platform as the client device 210a. As another example, the functionality of the gateway 220a may be performed by components of the client device 210a. In certain embodiments, the gateway 220a is not present. Such an arrangement may occur when the client device 210a does not need to utilize the gateway 220a to communicate with the exchange 230a, for example. For example, if the client device 210a has been adapted to communicate directly with the exchange 230a.

Additional trading devices (not shown), which are similar to client device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. Example Computing Device

Figure 3:
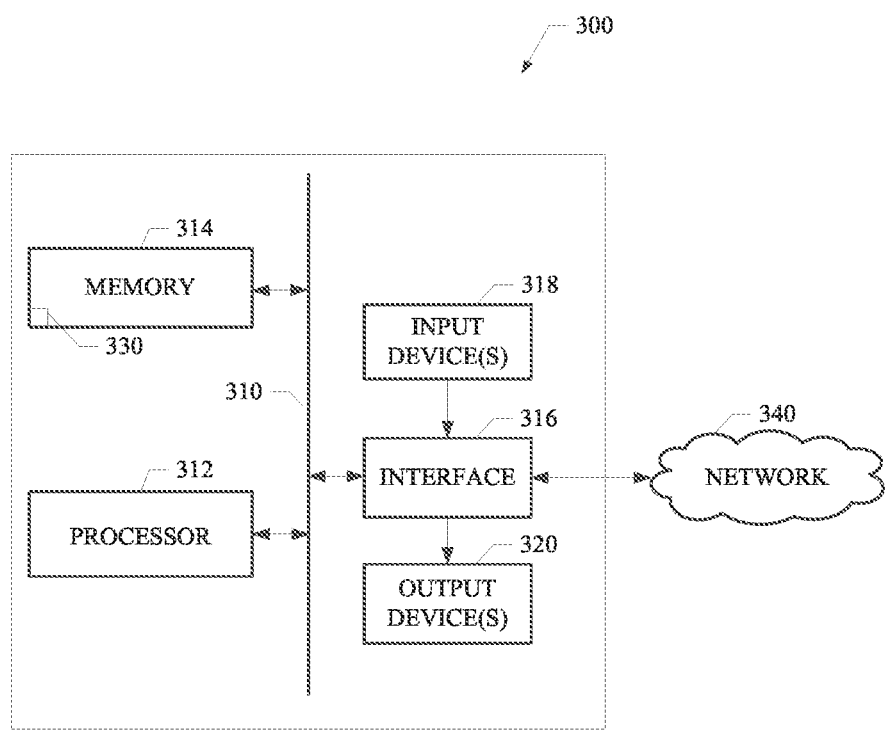
FIG. 3 illustrates a block diagram of an example computing device which may be used to implement the disclosed embodiments.

FIG. 3 illustrates a block diagram of an example computing device 300 which may be used to implement the disclosed embodiments. The client device 110 of FIG. 1 may include one or more computing devices 300, for example. The gateway 106 of FIG. 1 may include one or more computing devices 300, for example. The exchange 102 of FIG. 1 may include one or more computing devices 300, for example. The computing device 300 may include additional, different, or fewer components.

The computing device 300 includes a communication bus 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication bus 310. The communication bus 310 may include a communication bus, channel, network, circuit, switch, fabric, or other mechanism for communicating data between components in the computing device 300. The communication bus 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication bus 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application 330 may be transferred from the input device 318 and/or the network 340 to the memory 314. When the computing device 300 is running or preparing to run the trading application 330, the processor 312 may retrieve the instructions from the memory 314 via the communication bus 310.

Figure 4:
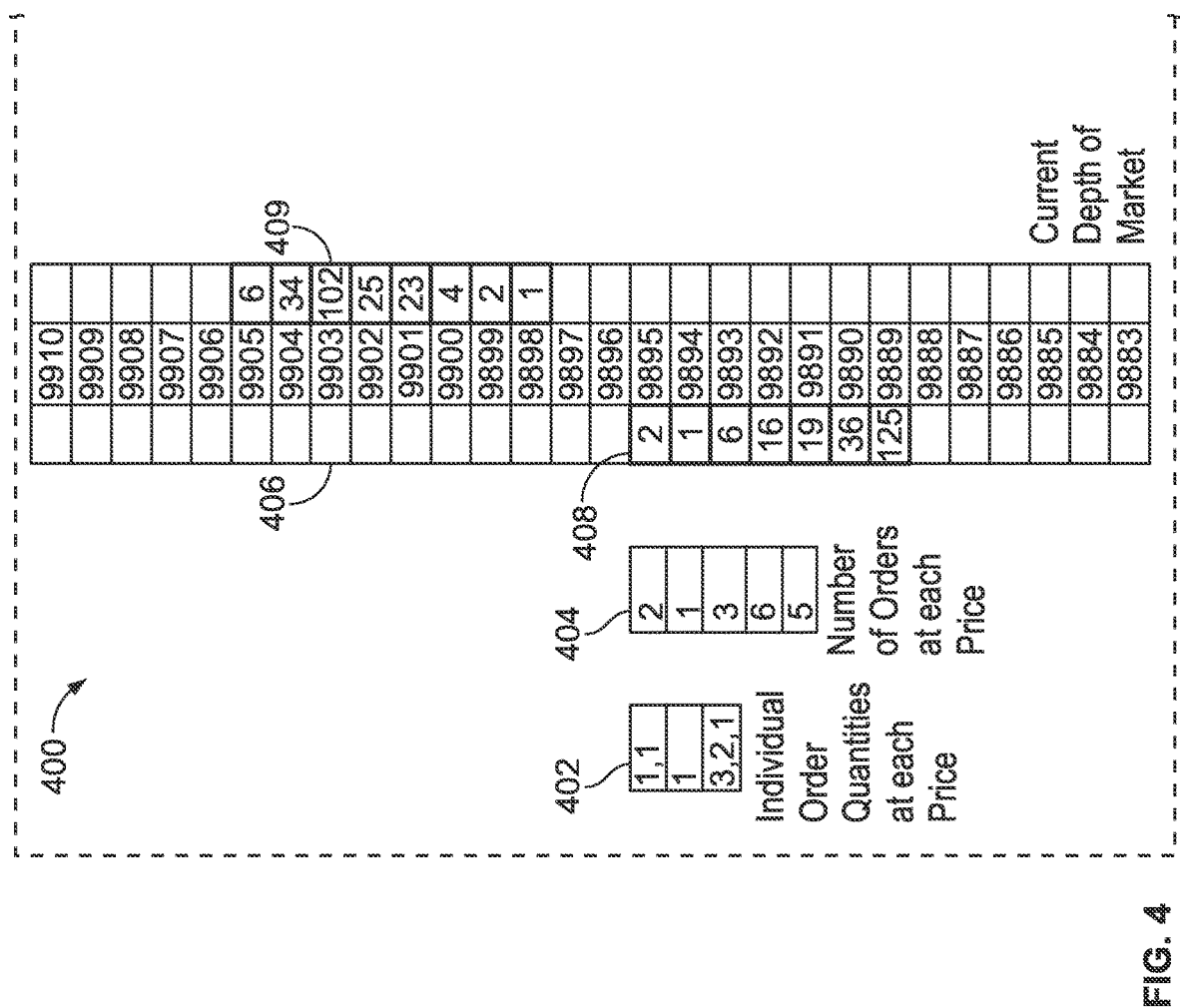
FIG. 4 is a detailed example depicting pre- and post-event states of a relevant depth of market data and a sample logically reduced causally linked message construct.

V. Example Embodiments to Generate Market Information Based on Causally Linked Events FIG. 4 provides an example assembly 400 of an event message construct 410 including causally linked market information. In FIG. 4, an example trade event message 410 is depicted to illustrate a change in construction of market data messages. Market data messages can arrive at a gateway 106 and/or exchange 102 in one or more data packets to be processed, for example. As shown in the example of FIG. 4, a single contract including five (5) sequential trades is being executed. Based on the sequence of trades and associated type(s) of data, market data messages associated with the sequence of trades can be automatically sorted and packaged into a combined message construct as events occur. Aggregation of market event information continues while the gateway 106 or exchange 102 is receiving the same type of information for the same trading contract or some other type of predetermined data flag is received indicating the end of an event sequence. Otherwise, the aggregated construct is completed and transmitted, and the gateway 106/exchange 102 looks for the next set of messages to be linked.

As shown in the example 400 of FIG. 4, construction of causally linked market data messages can be facilitated by appending descriptive and relevant multi-element event summary data 418 following a preamble of administrative data 412, such as message type (for example, a differentiating message type found in the header portion 412), followed by a logically compressed representation of detailed matched quantities 414. Price levels of matched quantities 414 can be logically deduced from entries indicative of offsets 426 from a base price 423 as a number of price increments. In certain embodiments, price levels can also be logically deduced, as demonstrated below, using parts of preceding event summary data and preceding market data already stored in memory storage 117 resident on the gateway device 106 (for example, a depth of market in memory storage 117) and/or memory storage 119 resident on the client device 110 (for example, a depth of market storage client 119) as logical helper keys. Adding multi-element event summary data to market data messages collectively gives a trader an ability to know what he or she wishes to know upon receipt of a single message rather than having to process a random number of separate messages or sort through a variable amount of duplicative data entries within a single message before the requisite information becomes fully available.

Returning to the embodiment illustrated in FIG. 1, the exchange 102 represents the source at which market data messages are created and/or originated. The exchange 102 may be configured to generate market data messages organized as causally linked and logically reduced data constructs. However, as previously stated, similar causally linked and logically reduced data constructs can be implemented at the gateway 106 in the absence of implementation at one or more exchanges 102.

In certain embodiments, post-gateway data distribution benefits from the causal linking of data in a market data message. For example, market data originating from an exchange 102 may be causally linked and logically reduced into data constructs and broadcast to a gateway 106 for consumption by the client device 110. Causally linking and logically reducing data in a market data message results in proportional reductions in computational, propagation, and crowding out latencies by lowering message volume between the gateway 106 and the client device 110. The implementation of the example data constructs efficiently organizes and logically reduces data representing related market events streaming from the exchange 102 simultaneously or substantially simultaneously throughout the electronic trading infrastructure.

As disclosed herein, implementations for causally linking and logically reducing data in a market data message are illustrated for both exchange-based and gateway-based configurations.

A. Example Exchange Implementation

FIG. 1 shows the client device 110 sending a message 112 inbound to the exchange 102. The inbound message 112 is received by the gateway 106, which processes the message 112 and sends a corresponding inbound message 114 to the exchange 102. Upon receipt of the message 114 from the client device 110 via a gateway 106, the exchange 102 processes the message 114 and determines if the message 114 is or will be part of a causally linked transaction, for example.

FIG. 4 depicts the recognition of an incoming order (for example, provided as an incoming message from the client device 110 to the exchange 102 via the gateway 106) to sell as a matchable order, and an exchange, such as the exchange 102 in the example of FIG. 1, flags or otherwise indicates the beginning of a new causally linked market event. The exchange 102 triggers storage in memory of all resultant data as the data is received in a local data structure/memory buffer 118 until all events causally linked to the current causal market event have been processed. For example, causally linked market events include matched individual trades and resultant depth of market updates considering, but not limited to the particular example provided.

The specific example of FIG. 4 illustrates a single order 400 to sell against current orders in a market depth 406 pending a match to buy or sell 408 and 409 for this particular market, with a quantity of five (5) and a price of 9893 or better. The exchange 102 is aware that there are buy orders waiting to be matched 408 at prices of 9895, 9894, and 9893 and so on. The exchange 102 also knows individual details of the orders currently awaiting a match, specifically, individual quantities of each order at each price 402 and a number of orders at each price 404.

The exchange 102 processes the incoming order. The exchange 102 matches the incoming order quantity sequentially in priority order (or any matching rules set by an exchange) against each pending order 402 having a quantity that is less than or equal to the incoming order quantity and a price that is greater than or equal to the incoming order. The exchange 102 continues processing until the total quantity of the incoming order has been matched against all possible pending orders meeting the criteria.

In the example of FIG. 4, once a causally linked market event has been detected and/or identified, the example systems, methods and apparatuses match the identified market event against a first of two orders 404 currently pending at a price of 9895 with quantities of one each 402. Following that event, the next event in the example is a match against one order 404 at a price of 9894 for a quantity 402 of one. Then, a partial match against the first order in queue 402 at a price of 9893 is found for an as yet unmatched quantity of two. Market information details are stored sequentially within data structure 118 (see FIG. 1) as the individual matches are completed. This example match sequence results in four separate individual trades 433 at the prices and quantities illustrated. The pre-trade depth of market 406 including pending orders to buy 408 and sell becomes the resultant depth of market 429 with a remaining set of pending orders to buy 430.

After the transaction completes, the exchange 102 logically constructs a message 410 with sequenced content to send to the gateway 106 for further processing and subsequent propagation of market information to the client device 110. The exchange 102 populates header information 412 to enable the gateway 106 to determine the message type and other administrative details such as market identifier (ID), timestamp, etc. The exchange 102 populates calculated summary information 418 with specific details derived from the data stored in the data storage 118, etc. Summary information 418 may include whether the triggering event was a buy or sell order 419 (in this example 1=buy and 2=sell), a total quantity of the incoming order traded 420, a number of price levels that the incoming order traded 421, etc.

Next, the exchange 102 may use the stored data in the data structure 118 to populate trade details 414. In the example shown in FIG. 4, a trade details block 414 may begin with a total number of pending orders against which the incoming order is matched 422. The trade details 414 also includes a value equal to a base price or a price of a first pending order(s) matched 423, for example. The trade details 414 also includes a number of matched trades that occurred at the base price 424, for example. The trade details 414 also includes one or more (two in the example of FIG. 4) quantity value entries 425a, 425b indicated by the number of matched trades at that price value 424, for example. The trade details 414 also includes a price level delta 426 for the next series of matches, followed by the number of trades at that next level, followed by the number of respective quantity values so indicated, and so on in the same pattern until all trades are included in the message in the example compressed information format, for example. The message 410 ends with entries to update the depth of market accordingly that may not be otherwise logically deduced from the included set of data in the message up to that point. The last entry 428 in the message 410 shows one possible example entry indicating that an order that was partially filled needs to have its quantity adjusted from three down to one, for example.

Different exchanges provide different sets of details about pending orders and may only provide subsets of pending order information such as only the best ten price levels to buy or sell at any one time. As such, the closing entries in the constructed message may include any and all necessary entries in logically minimalist form to communicate the current state of trades and depth of market resultant from the trade event or other market event so considered as a single information object in logically minimalist compressed format, for example.

The example detailed trade block 414 shown in FIG. 4 includes optional information such as base price 423 and price level delta 426 for a second price level traded and a third price level delta which is also included in this example. In an alternative example, the base price 423 and price level delta 426 may be omitted to compress the message further. Instead, these values may be logically deduced upon receipt and processing by the gateway 106 and client device 110 based on gateway depth of market storage 117 or depth of market storage client 119 (see FIG. 1) and the summary trade data 418, for example.

Figure 5:
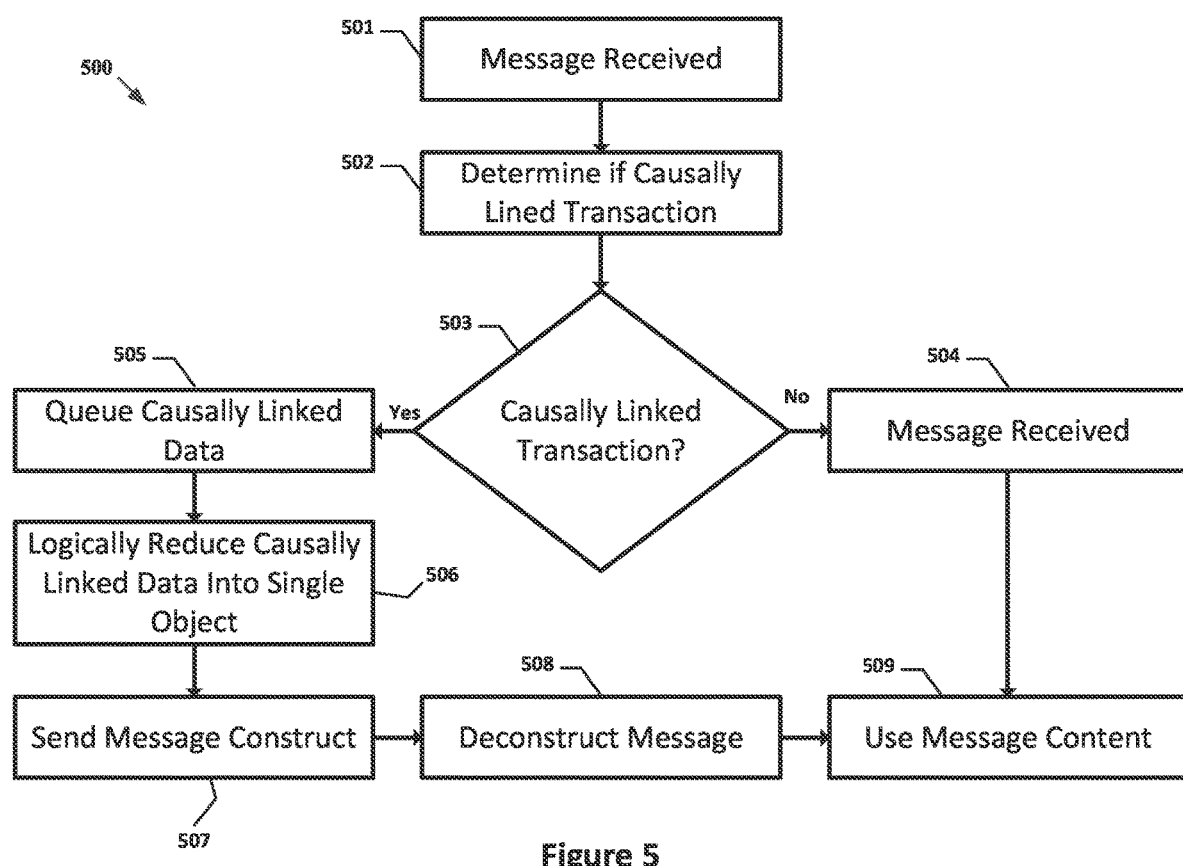
FIG. 5 is a timeline illustrating messages flowing through the example system shown in FIG. 1.

FIG. 5 illustrates an example method 500 to analyze and process incoming data messages. At block 501, a message 112, 114 is received. At block 502, once the message 114 is received, the exchange 102 determines if the message 114 will result in a series of causally linked market events. For example, information in one or more received data packets is analyzed to determine whether the market event described will be part of causally linked sequence of events. Data may be examined to look for one or more of a set of known conditions and/or other information to identify a buy, a sell, etc., as part of a spread and/or other trading strategy, for example. The exchange 102 may match an incoming message with n resting orders which result in x change(s) to depth and package and distribute the causally linked events as a single message construct, for example.

At block 503, the method 500 provides for two possible paths depending upon an outcome of the data packet analysis to determine whether the described market event is part of a causally linked transaction; if the message corresponds to only a non-causally linked market event, then at block 504, the exchange 102 constructs and sends a single message corresponding to the non-causally linked market event.

Otherwise, if the message received will result in a series of causally linked market events, then the exchange 102 processes the message 114 accordingly. At block 505, causally linked events are queued or otherwise stored until a last linked event is identified. At block 506, while a logically linked type of information is being created by the matching process, resulting event messages are collected until the completion of that match event which triggered the logically linked series of events. For example, the exchange 102 provides a source of market data that knows and can determine a beginning and end of event(s) that logically are linked causally. In a gateway implementation (described further below), however, the gateway 106 acts as a receiver and relies on streaming patterns such as receipt of data that is not part of a logical event, end of a packet, etc., as markets of the end of a sequence of causally related events absent a flag or other indicator from the exchange 102, for example. At block 507, the exchange 102 then constructs and sends a single logically reduced causally linked message, such as the message 410 illustrated in the example of FIG. 4. A set of rules may be used to govern expected trading events, message types, relationships, etc.

At block 508, the sent message is received and deconstructed at the client device 110. For example, the sequence of causally linked or related market data events is extracted from the received message construct for analysis and/or other use via the client device 110. At block 509, the client device 110 may use the message content to update a display, execute a next trade, and/or otherwise provide feedback to a user, device, etc.

In certain embodiments, the client device 110 can use the message construct to identify a current inside market state after the included trade before the exchange 102 has been able to update the client device 110. Thus, the client device 110 can use a total quantity traded delta included in the message construct content and subtract that amount from a last known good data value to know what the new market is without having to wait for the exchange 102 to provide a market depth update, thus potentially giving the trader an advantage in trading, for example. In one or more configurations, the trading advantages may constitute a multihundred millisecond time advantage.

B. Example Gateway Implementation

In certain embodiments, a gateway 106 implementation is provided similar to the exchange implementation disclosed above. In these embodiments, a source of input data used to construct a logically reduced causally linked market information object may include one or more messages, such as messages inbound 114 to and/or messages outbound 104 from the exchange 102 and processed by the gateway 106. In certain embodiments, message specifications for each exchange 102 connected to a gateway 106 may be analyzed to identify and/or solicit further information regarding timing, sequencing, and/or other aspects of their messaging behavior given the occurrence of market events that, by definition, are causally linked and, therefore, can be logically associated accordingly within a gateway implementation schema, for example. A set of message handling rules may be established to reflect given message constructs and behaviors of each connected exchange, for example.

Figure 6:
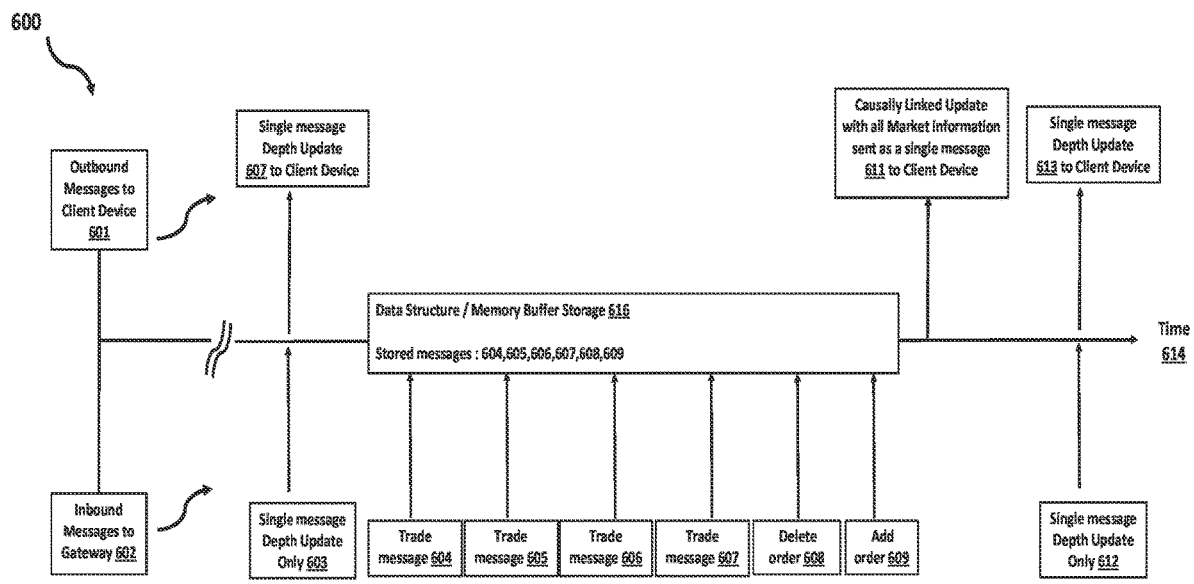
FIG. 6 is a flow chart illustrating an example method for creating data constructs used to efficiently communicate causally linked market events as single complete market information objects in an electronic trading environment.

Turning now to FIG. 6, a timeline or message data flow 600 is depicted to illustrate an example of message flow coming from an exchange 102 resulting from three independent sequential market events. A first event includes a single message depth update 603. A second event includes a possible gateway implementation of the example shown in FIG. 4 depicting a series of market data messages resulting from an order to sell five (5) at a price of 9893 or better as disclosed above. A third event includes a second single message depth update. For the first event, the message 603 comes into the gateway 106 and is recognized, based on previously implemented message handling rules, as a single message non-causally linked event. The message 603 is processed by the gateway 106, and data from the message 603 is used to generate a single message 607 to be sent to the client device 110. The same input and output is applied for messages 612 and 613 accordingly.

Looking at the series of messages starting with trade message 604, the gateway 106 recognizes this message 604 as a causally linked message and temporarily stores the data in a data structure/memory buffer 616. That is, the gateway 106 recognizes that causally linked messages are arriving at the gateway 106 and starts bundling the message content into a causally linked message construct until the gateway 106 determines that the linked messages have ended and an unrelated message has been received. For example, the gateway 106 continues processing Type 2 messages 605, 606, 607, and so on for as many messages that come in as trades until the gateway 106 receives a Type 1 message 608 or 609 indicating a change to a depth of market via a Delete 608 to remove the old price and quantity information and replace it with the new information in the Add 609 message. For example, messages 604 to 607 include a sequence of trade events causally linked to a Type 2 trade order. An end or change to that sequence of messages can be explicit (for example, a new trade sequence flag from the exchange 102, a market depth update, etc.) or implicit (for example, a user desired quantity is met, or other user criteria, etc.).

A change to the depth of market message indicates that the trade event sequence is ending or an exchange 102 may issue specific transaction start and stop messages which bookend the message block accordingly. In this case, for a particular exchange 102, the delete message 608 may be known to immediately precede a final add message adjusting the quantity of an order that was partially filled by the previous trade event. This example of FIG. 6 is predicated on the FIG. 4 example wherein an order to sell a quantity of five (5) at a price of 9893 or better results in four individual trade matches and a subsequent depth of market update including Type 1 messages 608 and 609 respectively used to update depth prices quantities resultant from the Type 2 trade event.

Once the gateway 106 determines that all associated data has arrived and is stored in the data structure/memory buffer 616, then the gateway 106 can follow the procedure detailed above for constructing the message 410 in the exchange implementation, for example. In certain embodiments, the message header 412 may include alternate numbers of and types of entries relevant to intermediary platform protocols as previously disclosed above. Otherwise, a single logically reduced causally linked data construct message may be propagated forward to the client device 110 for processing.

Causally linked messages typically arrive sequentially and close in time. Often, causally linked messages arrive within the same network packet or abutting packets and, as such, are resident in memory for sequential processing into the data structure/memory buffer 616. The causally linked messages are subsequently available for processing and sending as a single message 611. The constructed single message 611 likely will arrive and be available for processing at the client device 110 with a full market information set describing the market event sooner than it otherwise would have had the system been sending messages out sequentially one by one, propagating the set of messages across the network and processing the messages on the client device 110 individually as they arrived.

In certain embodiments, post-gateway data distribution benefits from the causal linking of data in a market data message. For example, market data originating from multiple exchanges 102 for multiple individual markets may be causally linked and logically reduced into data constructs and broadcast to multiple gateways 106 for consumption by one or more client devices 110. ADL™, AUTOSPREADER®, and/or AUTOTRADER™, provided by Trading Technologies can create synthetic spread markets that link two or more tradeable objects from one or more exchanges into a derivative synthetic tradeable object. Such synthetic objects' information can also be re-broadcast to enumerate consumers for any and all of the client device 110/210a purposes described herein. Causally linking and logically reducing data in a market data message results in proportional reductions in computational, propagation, and crowding out latencies by lowering message volume between the gateway 106 and the clients devices 110. The implementation of the example data constructs efficiently organizes and compresses data representing related market events streaming from multiple exchanges 102 simultaneously or substantially simultaneously throughout the electronic trading infrastructure.

C. Reading and Using Logically Reduced Causally Linked Message Constructs

Once a causally linked logically reduced market information object is received by a client device 110, a trader has the full set of information about the market event and has the option to process and use the specific information in any order of priority the trader wishes. For example, one trader may wish to know what the new inside market is right now, whereas another trader may wish to know the summary or the details of the trade event. This provides a new level of flexibility previously unavailable while also delivering the desired information faster. Once the object is received on the client device 110, the processing of the message to extract the desired information elements is a matter of arithmetic and comparative computation and is further described below. It should be understood that those skilled in the art may use variant computational methods to extract the information contained in the market information object or the gateway may choose to send alternative constructs based on the particular platform and that any examples provided below are but one possible method of use.

Referring back to FIG. 5, at block 508, the sent message is received and deconstructed at the client device 110. At block 509, the client device 110 may use the message content to update a display, execute a next trade, and/or otherwise provide feedback to a user, device, etc. The message 410 includes a transaction header block and an event information block, for example. By providing logical "keys" in the event information block, the client device 110 knows to set a read length to a certain number of reads including a certain number of bytes for each read, after which the client device 110 can expect data regarding a remaining quantity and number of order at the trade price. The entire event information block can be propagated at a time t0 as a single unit of information, for example.

In certain embodiments, the client device 110 can use the message construct to identify a current inside market state after the included trade before the exchange 102 has been able to update the client device 110. Thus, the client device 110 can use a total quantity traded delta and subtract that amount from a last known good data value to know what the new market is without having to wait for the exchange, thus giving the trader an advantage of potentially multi-hundred milliseconds in trading, for example.

Referring back to the example message 410 depicted in FIG. 4, the gateway 106 or client device 110 first processes the message header block 412 to complete administrative tasks and to select an appropriate depth of market memory storage 117 or 119 and/or other memory storage relevant to the particular market identified. From a message type field 434 in the message header block 412, the gateway 106 or client device 110 knows by pre-determined message specification with the exchange 102 that this message is a trade message and will have at least one trade and a depth of market update accordingly associated with the message.

In certain embodiments, by message specification pre-arrangement, the gateway 106 or the client device 110 is programmed to look for market event information a certain number of bytes into a read of a message. In an example, the first piece of event data is located twenty-eight (28) bytes into the message and has a length of one (1) byte. This method of data location within a message is but one example, and other methods may include templates and/or other methods to read and segment message sections accordingly. The value of two (2) at the twenty-eight (28) byte event data location in the message 419 indicates that this trade was triggered by a sell order, and, as such, the gateway 106 or client device 110 knows that subsequent calculations of trade details or depth of market updates are to be derived relative to pending orders to buy 408. A next value 420 is a total quantity traded and represents a quantity of the original event triggering order.

Using this information, the gateway 106 or client device 110 can derive additional market information used by traders to make trading decisions. These market information data points can be subsequently derived in any order chosen. For example, a time and sales value 432 may be derive to indicate that a total quantity of five (5) was sold to the pending buyers 408 down to a price of 9893. Additionally, a depth of market 429, more specifically a remaining pending quantity available to buy 430 at a price of 9893, can be quickly derived by sequentially subtracting the total trade quantity at each price level from the total quantity traded of five (5).

The example subtraction starts with a highest pending order to buy price, in this example a quantity of two at a price of 9895 and ending when a total quantity of five (5) has been removed from the depth of market. Thus, the first quantity of two (2) is less than five (5) and is therefore absorbed completely leaving a remaining quantity of three (3) to be matched and no quantity remaining available at the 9895 price level. Then, the remaining unmatched quantity of three (3) matches at the next price level 9894 with a quantity available and the quantity available is one (1). The quantity of one (1) is also absorbed leaving a remaining quantity of two (2) to be matched and no quantity left pending to buy at the price level 9894. Moving to a next available price level 9893, a quantity of six (6) is available to match. The remaining quantity of two (2) is subtracted from the six (6) leaving a remaining pending quantity to buy of four (4). These adjustments to the depth of market are made to the depth of market in memory storage 117 on the gateway 106 or the depth of market in memory storage 119 on the client device 110 and may subsequently be used as inputs to whatever trading decision mechanism is desired, for example.

At this point, a trader choosing to make trading decisions based on Type 1 messages indicating inside market/depth state and/or Type 2 messages indicating trade events based on the incoming order event as a whole may proceed without further computation, and subsequent read of remaining trade details 414 data can be sent off to a lower priority thread for processing and use in displays and/or other mechanisms, etc. Certain embodiments provide different options for market information transfer among devices such as a gateway 106 and a client device 110. If implemented at the exchange level, the messages received by a gateway 106 may be forwarded largely intact to the client device 110, whereby the same methods of message interpretation and use could be employed by the client device 110 as described herein saving possibly unnecessary processing time on the gateway 106. In many cases, to achieve reduced or minimum latencies, the client device 110 is directly connected to the exchange 102 and may, in such a case, process the exchange messages directly without alteration by a gateway device 106. Alternatively, such calculations can be done on the gateway 106 and only the result included before sending messages to the client device 110, thereby avoiding the calculation on the client. For example, a number of price levels traded 421 equaling three logically indicates that the two highest price levels 408 are now gone, leaving the best buy price level of 9893. An entry 428 may show a quantity of four remaining.

Regardless of the priority chosen for processing of trade details 414 of the message 410, information can be derived from the trade details block 414.

A next value available in the message 421 indicates that the incoming trigger order matched with pending buy orders 408 at, for example, three separate price levels. This value may be stored in a memory variable to be used subsequently. The next value available to read is the total number of pending orders matched 422. In the example of FIG. 4, the number of orders matched 422 indicates that four individual matches took place against the incoming trigger order. This value is also put in a temporary memory variable to be used as a counter to detect an end of individual trade quantity data. By pre-arranging message specifications with the exchange 102, the gateway 106 or the client device 110 knows to expect a base price 423 value located at an offset of a certain number of bytes into the message followed by a number of trades at the base price 424. In the example shown in FIG. 4, the values indicate that there were two trades at a price of 9895, and, therefore, the next value 424 and the following entry indicate the individual quantities of each of the two trades that have occurred at the base price.

Using the number of orders matched 422 value in memory, the gateway 106 or client device 110 knows that the data so far only indicates that two trades have been conducted at the first price level out of the four expected trades. The gateway 106 or client device 110 continues to read the message to find the remaining price level and trade information. In the example, the entry following the initial two quantity entries includes two new data values at certain byte offsets by pre-arrangement. A first value 426 indicates a number of price tick increments at which the next trade(s) took place as a delta from the base price 423. In this example, the gateway 106 or client device 110 knows that the trigger order was a sell and can logically deduces the next price level by subtracting the proper number of ticks as indicated. In this example, one tick is subtracted from the base price 423 to arrive at the next price level where trades were matched (for example, a price of 9894 in this example). A next value 427 indicates a number of trades occurring at the 9894 price level followed by respective quantities for a number of trades at the price indicated and so on until all individual trade quantities and price levels are accounted for accordingly. The message ends with adjustments, if applicable, to specific orders partially filled with remaining quantities still pending to be matched 428. The derived detailed per match data can then be used for any purpose such as for display output 433.

As shown in FIG. 4, the example detailed trade block 414 includes optional information such as base price 423 and price level delta 426 for a second price level traded and a third price level delta which is also included in this example. An alternative implementation may omit the base price 423 and price level delta 426 and the particular third price level delta so depicted in the specific example, compressing the message further. Instead, the gateway 106 or client device 110 may logically deduce price level information of each set of trades upon receipt and processing by the gateway 106 and/or client device 110 based on previously received last known values stored in gateway depth of market storage 117 or depth of market storage client 119 and summary trade data 418, for example. More specifically, the receiving device(s) can rely on the sequential nature of market information. If the total quantity traded 420 was five (5), as indicated in the example, then, in order to satisfy this quantity referencing the pending order to buy 408, the order to sell five (5) must have absorbed the pending quantities at prices of 9895, 9894, and a portion of the quantity available at 9893, respectively.

Thus, certain embodiments provide systems, methods and apparatuses to analyze incoming data packets at an exchange and/or at a gateway associated with one or more exchanges to identify and aggregate related trades and transmit the aggregated trades as a logically reduced information block. The block is accumulated until another contract or other type of information for the same contract (for example, a bid or an offer) is identified according to a provided rule set, for example.

Rather than sending multiple messages, a single aggregated message can be sent, thereby reducing a total amount sent. While microseconds or tens of microseconds may be saved per message, an aggregated savings given a heavy trading volume is significant, especially in the context of crowding out effects. For example, only a finite number of channels exist for market data transmission, but there are many contracts for each given channel. In certain embodiments, information is multicast globally and passes through switches, servers, networks, etc. Contracts, heartbeats, etc., are transmitted, and consolidation of related events for ease of transmission and analysis can significantly reduce network traffic and improve processing performance.

Additionally, by processing a consolidated message construct, a current market state can be determined in advance of an "official" notification from an exchange. A client trading device consuming a logically reduce message may not have to process all trades but may instead look at a total quantity delta traded (for example, a summary trade quantity 418 in the example of FIG. 4) and subtract that number from a last known market data value to determine a new inside market in advance of exchange notification. The client device can proceed to trade against this update before receiving the update from the exchange, for example.

Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention. Moreover, the methods of the invention can be applied to logically associate any causally linked events and logically construct information objects that contain the minimum amount of data elements necessary, thereby minimizing the information transfer latency between information creation and use, to logically compute or derive a complete information set describing any market event, to be used for whatever purpose anyone deems valuable.

The example embodiments discussed above describe systems, apparatuses, and methods to create data constructs descriptive of causally linked market events for delivery to a consumer of market data messages in an electronic trading environment. The creation and use of data constructs describing causally linked market events within a single market data message can reduce the size and number of market data messages currently used to fully describe market events thereby reducing latencies in the communication of market information from an exchange to a trader's client device given any current or future electronic trading infrastructure.

Systems, apparatuses, and methods, as described herein, are provided to substantially reduce the latency in the delivery of market information among the parties subscribed to an electronic transaction market accessed through a central electronic counterparty system, such as those operated by the world's financial exchanges. In an embodiment, by altering the content and structure of the market data messages typically transmitted from the world's electronic financial market exchanges to trading participants' devices and networks, valuable benefits are realized such as an increased information density using smaller data footprints thereby substantially reducing the latency of information transfer among and between participants, reduced message volumes at all points in the data chain and less processing overall system wide compared to existing systems, methods, and apparatuses.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for creating data constructs fully descriptive of causally linked market events may be embodied in a computer program product that includes one or more computer readable medium. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A computer readable medium having stored therein instructions executable by a processor, including instructions executable to:
   receive by a gateway a data message including a command to initiate a market event, wherein the data message is provided to an electronic exchange, wherein the market event results in a sequence of causally related market data messages generated by the electronic exchange;
   detect by the gateway from the electronic exchange the sequence of causally related market data messages associated with the market event;
   queue by the gateway the sequence of causally related market data messages;
   detect by the gateway an end of the market event;
   generate by the gateway a new logically reduced market data message including grouped market data in the queued causally related market data messages, wherein the grouped market data groups together the causally related market data messages related to the market event; and
   send by the gateway the new logically reduced market data message to a client device.

2. The computer readable medium of claim 1, wherein the data message is a trade order message.

3. The computer readable medium of claim 1, wherein the sequence of causally related market data messages includes fill related messages.

4. The computer readable medium of claim 1, wherein the sequence of causally related market data messages is associated with a spread trading strategy.

5. The computer readable medium of claim 1, wherein the end of the market event is detected upon receiving a market depth update message.

6. The computer readable medium of claim 1, wherein the end of the market event is detected upon receiving an indication that an order quantity corresponding to a trade order associated with the market event is fully filled.

\* \* \* \* \*